US008432423B2

(12) United States Patent
Peregrym

(10) Patent No.: US 8,432,423 B2
(45) Date of Patent: Apr. 30, 2013

(54) BIDIRECTIONAL IMAGING WITH VARYING SPEEDS

(75) Inventor: Greg Peregrym, New Westminster (CA)

(73) Assignee: Kodak Graphics Communications Canada Company, Burnaby (CA)

( * ) Notice: Subject to any disclaimer, the term of this patent is extended or adjusted under 35 U.S.C. 154(b) by 499 days.

(21) Appl. No.: 12/679,336

(22) PCT Filed: Sep. 25, 2007

(86) PCT No.: PCT/IB2007/002797
§ 371 (c)(1),
(2), (4) Date: Mar. 22, 2010

(87) PCT Pub. No.: WO2009/040593
PCT Pub. Date: Apr. 2, 2009

(65) Prior Publication Data
US 2011/0316955 A1    Dec. 29, 2011

(51) Int. Cl.
*B41J 2/47* (2006.01)
(52) U.S. Cl.
USPC .......................................... 347/225; 347/240
(58) Field of Classification Search .................. 347/224, 347/225, 233, 236, 239, 240, 246, 251, 252, 347/253
See application file for complete search history.

(56) References Cited

U.S. PATENT DOCUMENTS

| 5,517,231 | A | * | 5/1996 | Sarraf ........................... 347/252 |
| 5,517,359 | A | | 5/1996 | Gelbart |
| 6,522,092 | B2 | * | 2/2003 | Sakurai et al. ................ 347/239 |
| 6,582,875 | B1 | | 6/2003 | Kay et al. |
| 6,595,612 | B1 | | 7/2003 | Brown et al. |
| 6,957,773 | B2 | | 10/2005 | Gelbart |
| 8,233,020 | B2 | * | 7/2012 | Stevenson et al. ............ 347/240 |

\* cited by examiner

*Primary Examiner* — Kristal Feggins
(74) *Attorney, Agent, or Firm* — Nelson Adrian Blish

(57) ABSTRACT

A method is provided for forming an image on a media while the media is moved relative to an imaging head. The media can include a pattern of registration sub-regions, such as a matrix. The image can include one or more patterns of features, such as color features for a color filter which can be registered with the pattern of registration sub-regions. The images can be formed by a laser-induced thermal transfer process. The method can include the steps of operating an imaging head to emit imaging beams. A first portion of the image is formed while scanning a first group of imaging beams in a first direction over the media at a first scanning speed and a second portion of the image is formed while scanning a second group of the imaging beams in a second, opposite direction over the media at a second, different scanning speed.

35 Claims, 9 Drawing Sheets

BIDIRECTIONAL IMAGING WITH VARYING SPEEDS

CROSS REFERENCE TO RELATED APPLICATIONS

This is a U.S. National Stage application under 35 U.S.C. 371 of International Application No. PCT/IB2007/002797, filed Sep. 25, 2007.

TECHNICAL FIELD

The invention relates to imaging systems and to methods for forming images. The invention may be applied to fabricating color filters for electronic displays, for example.

BACKGROUND

Color filters used in display panels typically include a pattern comprising a plurality of color features. The color features may include patterns of red, green and/or blue color features, for example. Color filters may be made with color features of other colors. The color features may be arranged in any of various suitable configurations. Prior art stripe configurations have alternating columns of red, green and blue color features as shown in FIG. 1A.

FIG. 1A shows a portion of a prior art "stripe configuration" color filter 10 having a plurality of red [R], green [G] and blue [B] color features 12, 14 and 16 respectively formed in alternating columns across a receiver element 18. Color features 12, 14 and 16 are outlined by portions of a color filter matrix 20 (also referred to as matrix 20). The columns can be imaged in elongated stripes that are subdivided by matrix cells 34 (also referred to as cells 34) into individual color features 12, 14 and 16. TFT transistors on the associated LCD panel (not shown) may be masked by areas 22 of matrix 20.

The stripe configuration shown in FIG. 1A illustrates one example configuration of color filter features. Color filters may have other configurations. Mosaic configurations have the color features that alternate in both directions (e.g. along columns and rows) such that each color feature resembles an "island". Delta configurations (not-shown) have groups of red, green and blue color features arranged in a triangular relationship to each other. Mosaic and delta configurations are examples of "island" configurations. FIG. 1B shows a portion of a prior art color filter 10 arranged in a mosaic configuration in which color features 12, 14 and 16 are arranged in columns and alternate both across and along the columns.

Other color filter configurations are also known in the art. Whereas the illustrated examples described above show patterns of rectangular shaped color filter elements, other patterns including other shaped features are also known. The shape and configuration of a color filter feature can be selected to provide desired color filter attributes such as a better color mix or enhanced viewing angles.

Various imaging methods are known in the art and can be used to form various features on a media. For example, laser-induced thermal transfer processes have been proposed for use in the fabrication of displays, and in particular color filters. In some manufacturing techniques, when laser-induced thermal transfer processes are used to produce a color filter, a color filter substrate also known as a receiver element is overlaid with a donor element that is then image-wise exposed to selectively transfer a colorant from the donor element to the receiver element. Preferred exposure methods use radiation beams such as laser beams to induce the transfer of the colorant to the receiver element. Diode lasers are particularly preferred for their low cost and small size.

Laser induced "thermal transfer" processes include: laser induced "dye transfer" processes, laser-induced "melt transfer" processes, laser-induced "ablation transfer" processes, and laser-induced "mass transfer" processes. Colorants transferred during laser-induced thermal transfer processes include suitable dye-based or pigment-based compositions. Additional elements such as one or more binders may be transferred.

Some conventional laser imaging systems emit a limited number of imaging beams. Other conventional systems reduce the time required to complete images by controlling hundreds of individually-modulated imaging channels to emit corresponding imaging beams. Imaging heads with large numbers of such "channels" are available. For example, a SQUAREspot® model thermal imaging head manufactured by Kodak Graphic Communications Canada Company, British Columbia, Canada has several hundred independent channels. Each channel can have power in excess of 25 mW. An array of imaging channels can be controlled to write an image in a series of image swaths which are arranged to form a continuous image.

Imaging beams are scanned along a scan path to form various images. In some cases, imaging beams are scanned in a first direction during a first scan and are scanned in a second direction during a second scan such that the second direction is different than the first direction. Bidirectional imaging refers to the case in which the second direction is opposite to the first direction. Bidirectional imaging techniques can be used enhance the productivity of the imaging process since the start of each scan need not occur at a common position.

The visual quality of a formed image can be an important consideration in the selection of a particular imaging process. In applications such laser-induced thermal transfer of color filter features, the quality of the formed color filter is dependant on imaging features that have substantially the same visual characteristics. For example, one particular visual characteristic can include optical density or color density. Density variations among the imaged color features can lead to objectionable image artifacts. Image artifacts can include banding or color variations in imaged features.

Artifacts such as banding can be difficult to correct and typically require the establishment of imaging parameters that lead to formation of image swaths that include substantially the same characteristics. It has been noted however by the present inventors that when the same imaging parameters are employed to scan imaging beams both in a first direction during a first scan and a second direction different from the first direction during a second scan, various image artifacts can still arise. This can impact the usefulness of imaging methods such as bidirectional imaging.

There remains a need for effective and practical imaging methods and systems that permit making high-quality images of features while scanning in different scan directions.

There remains a need for effective and practical imaging methods and systems that permit making high-quality images of features in a bidirectional imaging system.

There remains a need for imaging methods that can be used to reduce differences between portions of an image formed by imaging beams scanned in a first direction during a first scan and additional portions of the image formed by imaging beams scanned in a second direction different from the first direction during a second scan.

There remains a need for improved imaging methods that can form a plurality of features with substantially the same characteristics while scanning in different scan directions such that some features are to be formed while scanning in a first direction while other features are formed while scanning in a second direction opposite to the first direction.

SUMMARY OF THE INVENTION

The present invention relates to a method for forming an image on a media while the media is moved relative to an imaging beam. The media can include a pattern of registration sub-regions, such as, for example, a matrix. The image can include one or more patterns of features, such as color features for a color filter or colored illumination sources as part of an organic light emitting diode display. The one or more patterns of features can be registered with the pattern of registration sub-regions. The features could be island features wherein each feature of a first plurality of features of a first color is separated from each other feature of the first color by a feature of a different color. The features can be stripes which may or may not be interrupted in one or more directions. The edges of the features can be skewed with respect to an arrangement direction of imaging channels of an imaging head.

The images can be formed by a laser-induced thermal transfer process such as a laser-induced dye-transfer process, a laser induced mass transfer process or by other means of transferring material from a donor element to a receiver element.

The method can include the steps of operating an imaging head which has one or more imaging channels to emit imaging beams. A first portion of the image is formed while scanning a first group of imaging beams in a first direction over the media at a first scanning speed and a second portion of the image is formed while scanning a second group of the imaging beams in a second direction over the media at a second scanning speed. The second scanning speed is different from the first scanning speed and the second direction can be opposite to the first direction. In one embodiment, the first portion of the image is formed with a first exposure and second portion of the image is formed with a second, different exposure.

In one embodiment, at least one of the media and the imaging head are moved along a first path while forming the first portion of the image and at least one of the media and the imaging head are moved along a second, parallel path while forming the second portion of the image. For example, either the media or the imaging head can be moved in a forward direction for the first path and the media or the imaging head can be moved in a reverse direction for the second path. The relative motions of the media and imaging heads can be at different rates during formation of the first and second image portions, and the exposure can vary between the first and second scan. The relative motion can be in a main-scan and sub-scan direction simultaneously in a coordinated motion.

In one example embodiment, the first image portion includes a plurality of sub-portions separated from one another and the second portion of the image is formed between the separated sub-portions. The second portion of the image can overlap the first portion of the image.

In one example embodiment the imaging head is moved relative to the media along the first path by moving one of the imaging head and the media in a first direction and moving the other of the imaging head and the media in a second direction substantially perpendicular to the first direction, and the imaging head is moved relative to the media along the second path by moving the one of the imaging head and the media in a third direction and moving the other of the imaging head and the media in a forth direction substantially perpendicular to the third direction. The ratio of the rate of movement in third direction to the rate of movement in the fourth direction is adjusted to equal the ratio of the rate of movement in first direction to the rate of movement in the second direction. In one example, the first portion of the image is formed with a first exposure and the second portion of the image is formed with a second exposure which is different from the first exposure. The second exposure can be equal to or are greater than an exposure threshold of the media.

A program product can be provided to cause a controller to carry out the method of the present invention.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive, sense.

Figure 1A:
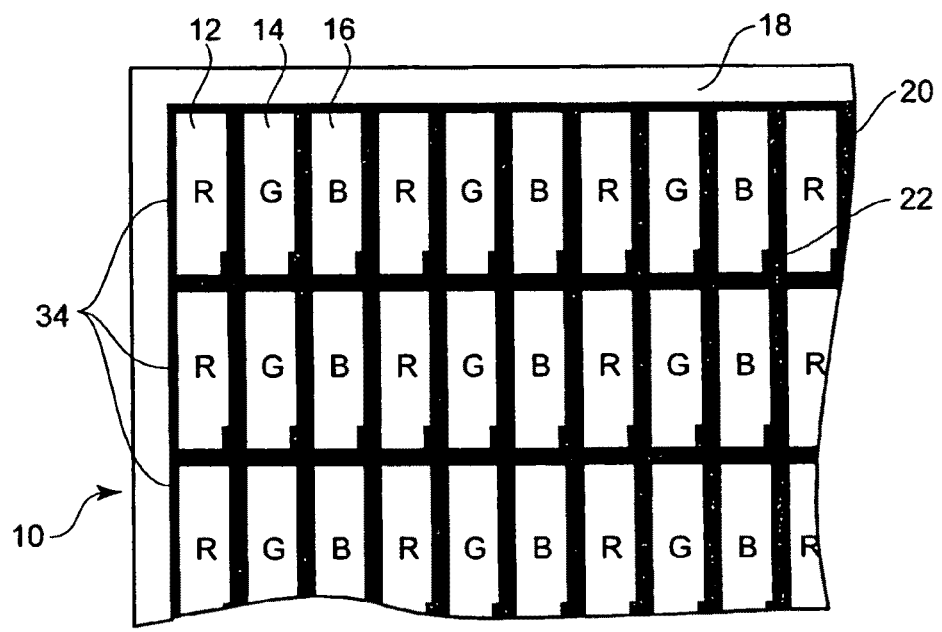
FIG. 1A is a plan view of a portion of a prior art color filter.
Figure 1B:
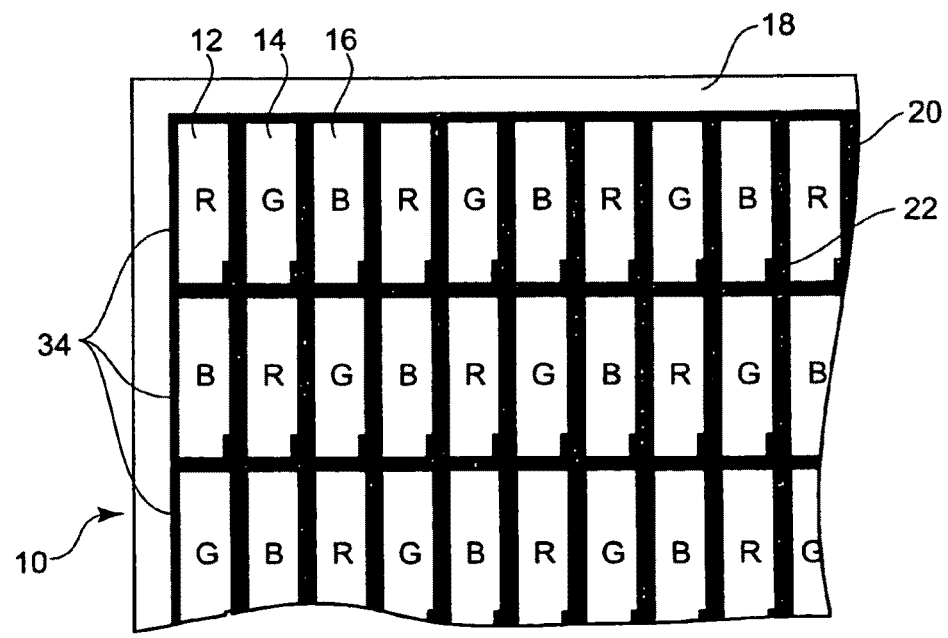
FIG. 1B is a plan view of a portion of another prior art color filter.
Figure 2:
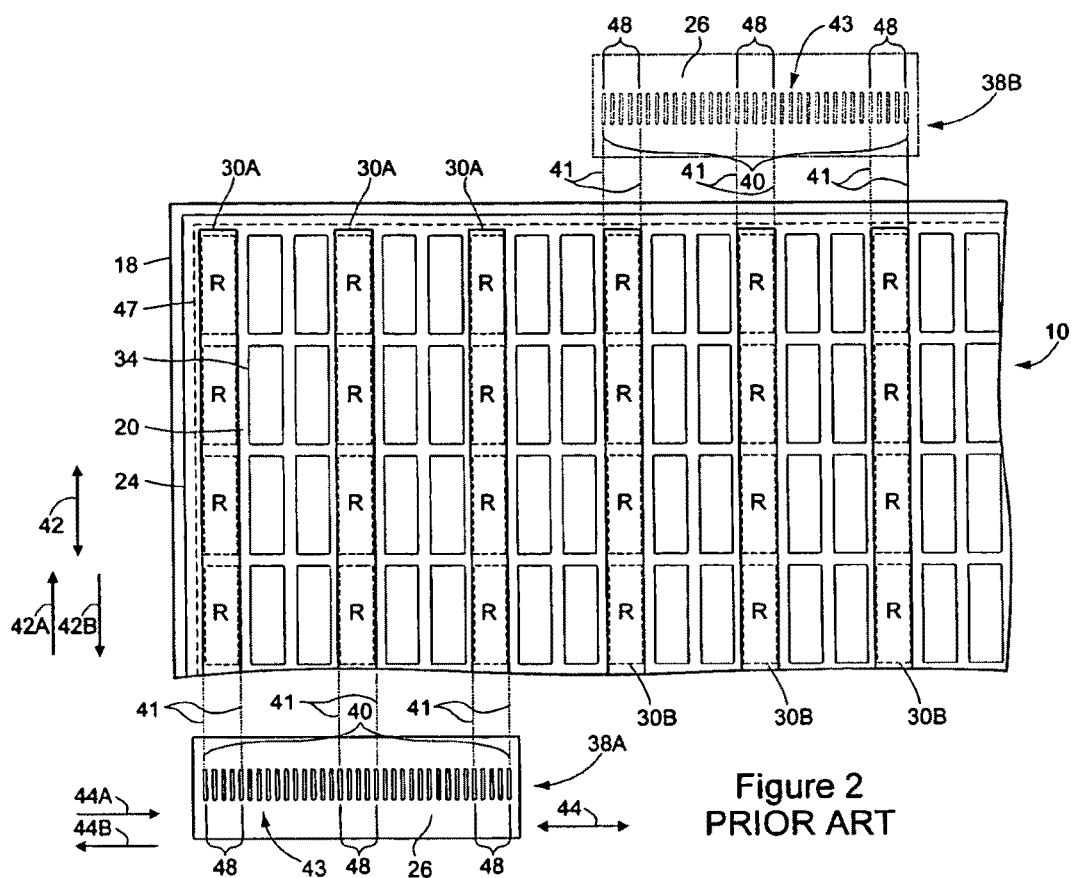
FIG. 2 is a schematic representation of a multi-channel head conventionally imaging a pattern of features onto imagable media during a plurality of scans.

FIG. 2 schematically shows a conventional laser-induced thermal transfer process being used to fabricate a color filter 10. An imaging head 26 is provided to transfer image-forming material (not shown) from a donor element 24 to an underlying receiver element 18. Donor element 24 is shown as being smaller than receiver element 18 for the purposes of clarity only. Donor element 24 may overlap one or more portions of receiver element 18 as may be required. Imaging head 26 can include one or more imaging channels. In this case, imaging head includes a plurality of individually addressable channels 40 arranged in a channel array 43.

Receiver element 18 can include a registration region with which it is desired to form images of one or more features in substantial alignment. Receiver element 18 can include a pattern of registration sub-regions with which it is desired to form images of one or more features in substantial alignment. In this case, receiver element 18 includes a registration region 47 (schematically represented in large broken lines). In this case, registration region 47 includes a color filter matrix 20. Matrix 20 is an example of a pattern of registration sub-regions. Although a laser-induced thermal transfer process could be used to form matrix 20 on receiver element 18, matrix 20 is typically formed by lithographic techniques.

Donor element 24 includes an image-forming material (not shown) that can be image-wise transferred onto the receiver element 18 when imaging beams emitted by imaging head 26 are scanned across donor element 24. Red, green and blue portions of filter 10 are typically imaged in separate imaging steps; each imaging step involves replacing the preceding color donor element with the next color donor element to be imaged. Each of the red, green and blue features of the filter is typically transferred to receiver element 18 such that the color features are to be substantially aligned with a corresponding matrix cell 34. After the color features have been transferred, the imaged color filter may be subjected to one or more additional process steps, such as an annealing step for example, to change one or more physical properties (e.g. hardness) of the imaged color features.

Figure 3:
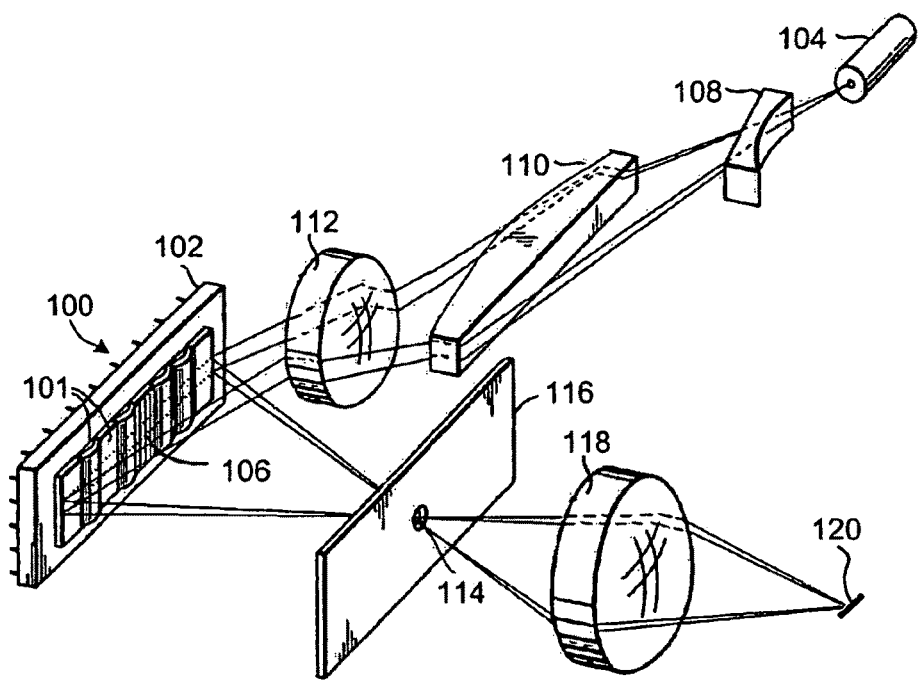
FIG. 3 is a schematic perspective view of the optical system of an example prior art multi-channel imaging head.

An example of an illumination system employed by a conventional laser-based multi-channel imaging process is schematically shown in FIG. 3. A spatial light modulator or light valve is used to create a plurality of imaging channels. In the illustrated example, linear light valve array 100 includes a plurality of deformable mirror elements 101 fabricated on a semi-conductor substrate 102. Mirror elements 101 are individually addressable. Mirror elements 101 can be micro-electro-mechanical (MEMS) elements, such as deformable mirror micro-elements, for example. A laser 104 can generate an illumination line 106 on light valve 100 using an anamorphic beam expander comprising cylindrical lenses 108 and 110. Illumination line 106 is laterally spread across the plurality of elements 101 so that each of the mirror elements 101 is illuminated by a portion of illumination line 106. U.S. Pat. No. 5,517,359 to Gelbart describes a method for forming an illumination line.

A lens 112 typically focuses laser illumination through an aperture 114 in an aperture stop 116 when elements 101 are in their un-actuated state. Light from actuated elements 101 is blocked by aperture stop 116. A lens 118 images light valve 100 to form a plurality of individual image-wise modulated beams 120, which can be scanned over the area of a substrate to form an imaged swath. Each of the beams is controlled by one of the elements 101. Each element 101 corresponds to an imaging channel of a multi-channel imaging head.

Each of the beams is operable for imaging, or not imaging, an "image pixel" on the imaged receiver element in accordance with the driven state of the corresponding element 101. That is, when required to image a pixel in accordance with the image data, a given element 101 is driven to produce a corresponding beam with an intensity level magnitude and duration suitable for imparting a pixel image on the substrate. When required not to image a pixel in accordance with the image data, a given element 101 is driven to not produce an imaging beam. As used herein, pixel refers to a single element of image on the substrate, as distinguished from the usage of the word pixel in connection with a portion of an image displayed on an assembled display device. For example, if the present invention is used to create a filter for a color display, the pixels created by the present invention will be combined with adjacent pixels, to form a single pixel (also referred to as a feature) of an image displayed on the display device.

FIG. 2 shows a portion of a color filter receiver element 18 that has been conventionally patterned with a plurality of red stripe features 30A and 30B (collectively referred to as stripe features 30) in a laser-induced thermal transfer process. FIG. 2 depicts the correspondence between imaging channels 40 and the transferred pattern as broken lines 41. Features, such as stripes 30A and 30B generally have sizes that are greater than a width of a pixel imaged by an imaging channel 40. The imaging beams generated by imaging head 26 are scanned over receiver element 18 while being image-wise modulated according to image data specifying the pattern of features to be written. Groups 48 of imaging channels 40 are driven appropriately to produce imaging beams wherever it is desired to form a feature. Channels 40 not corresponding to the features are controlled so as not to image corresponding areas.

Receiver element 18, imaging head 26, or a combination of both, are moved relative to one another while the channels 40 of the imaging head 26 are controlled in response to image data to create image swaths. In some cases imaging head 26 is stationary and receiver element 18 is moved. In other cases receiver element 18 is stationary and imaging head 26 is moved. In still other cases, both the imaging head 26 and the receiver element 18 are moved.

Imaging channels 40 can be operated to form an image swath during a scan of imaging head 26. Receiver element 18 can be too large to be imaged within a single image swath. Multiple scans of imaging head 26 are typically required to complete an image on receiver element 18.

Movement of imaging head 26 along sub-scan axis 44 may occur after the imaging of each swath is completed along main-scan axis 42. Alternatively, with a drum-type imager, it may be possible to relatively move imaging head 26 along both the main-scan axis 42 and sub-scan axis 44, thus writing the image with swaths extending helically on the drum. In FIG. 2, relative motion between imaging head 26 and receiver element 18 is provided along a path aligned with main-scan axis 42. In this case, receiver element 18 is movable in forward direction 42A and in reverse direction 42B with respect to imaging head 26. Forward direction 42A is parallel and opposite to reverse direction 42B. Receiver element 18 can reciprocate between forward direction 42A and reverse direction 42B. In FIG. 2, relative motion between imaging head 26 and receiver element 18 is provided along a path aligned with sub-scan axis 44. In this case, imaging head 26 can move in away direction 44A and in home direction 44B. Away direction 44A is parallel and opposite to home direction 44B.

Any suitable mechanism may be applied to move imaging head 26 relative to receiver element 18. Flat bed imagers are typically used for imaging receiver elements 18 that are relatively rigid, as is common in fabricating display panels. A flat bed imager has a support that secures a receiver element 18 in a flat orientation. U.S. Pat. No. 6,957,773 to Gelbart describes a high-speed flatbed imager suitable for display panel imaging. Alternatively, flexible receiver elements 18 can be secured to either an external or internal surface of a "drum-type" support to affect the imaging of the image swaths.

In FIG. 2, stripe features 30A are imaged during a first scan in which imaging head 26 (in first position 38A) directs imaging beams towards receiver element 18 as receiver element 18 is moved in reverse direction 42B. On completion of the first scan, imaging head 26 (in first position 38A) is displaced along sub-scan axis 44 to a second position 38B (shown in broken lines). Stripe features 30B are imaged during a second scan in which imaging head 26 (in new position 38B) directs imaging beams towards receiver element 18 as receiver element is moved in forward direction 42A. Stripe features 30A and 30B are imaged by bidirectional scanning techniques. Bidirectional scanning techniques can enhance imaging productivity since scans are made on both in a forward scanning direction and in a reverse scanning direction.

Banding refers to an image artifact that repeats in a direction that intersects a direction in which the image swaths extend. Some banding artifacts are typically characterized by visual differences that repeat from image swath-to-image swath. For example, if adjacent image swaths are separated from one another by a gap, the gaps can repeat to produce a banding artifact. If adjacent image swaths overlap each other, the overlapped regions can repeat to produce a banding artifact. If density variations occur across each of the image swaths in a repeatable manner, the repeating density variations can product a banding artifact. Banding artifacts can arise from image variations in areas proximate to image swath-to-image swath boundaries. Banding artifacts can arise from variations within an image swath that repeat from image swath-to-image swath. Many banding artifacts repeat on intervals equal to the image swath width.

The present inventors have surprisingly noted that other image artifacts can arise when bidirectional imaging techniques are employed. Visual differences have been noted when a first image swath formed by scanning in a first direction is compared against a second image swath formed by scanning in a second direction that is opposite to the first direction. When many image swaths are formed using bidirectional scanning techniques in which image swaths imaged in the first direction alternate with image swaths imaged in the second direction, the visible differences between the adjacent swaths repeat to produce a "banding-like" artifact. In this case, the differences repeat every two swath widths when two image swaths formed by scanning in the first direction are separated from one another by a third image swath formed by scanning in the second direction. Visible differences can include differences in density (e.g. optical density or color density).

Referring back to FIG. 2, visible differences can arise between stripe features 30A and 30B even though they are substantially identical in shape and size. Visible differences can occur even when a given stripe 30B is imaged during the second scan by the same group 48 of imaging channels used to image a given stripe 30A during the first scan. In this case, the bidirectional nature of the scans imparts visible differences between their associated imaged features.

Figure 7:
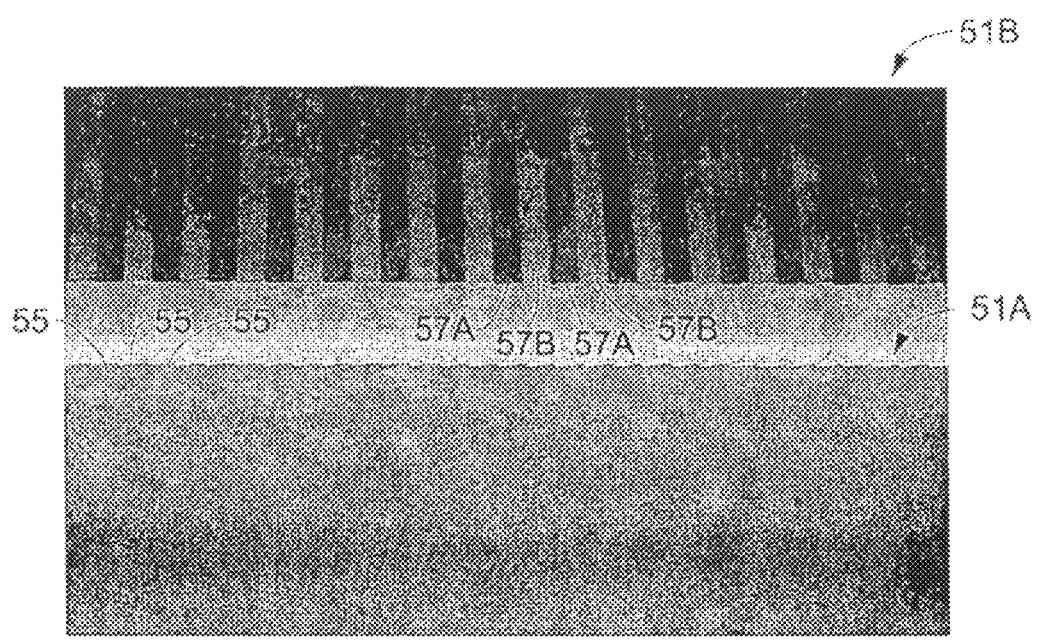
FIG. 7 shows a photograph comparing a media scanned bidirectionally and unidirectionally.

FIG. 7 is a photograph comparing a series of image swaths imaged using conventional bidirectional and unidirectional techniques. Image 51A is imaged unidirectionally with a plurality of image swaths 55, each of which were scanned along a common direction. Image 51B is imaged bidirectionally with a plurality of image swaths 57A and 57 B. Image swaths 57A were scanned along a direction that opposes the direction in which image swaths 57B were scanned. Both images 51A and 51B were formed by laser-induced thermal transfer. Although some minor swath-to-swath banding was present (not clearly visible in this photograph), image 51A shows that each of image swaths 55 have similar visual characteristics. In comparison, image 51B clearly shows visual differences between the bidirectionally imaged swaths 57A and 57B. A banding artifact that repeats every two swaths is visible. Although this artifact is clearly visible with the unaided eye, the FIG. 7 photograph has been enhanced for reproduction herein.

Although they do not want to be bound by any particular theory, the present inventors consider that one or more various causes can contribute to visual differences between the various image portions formed by bidirectional scans. Without limitation, one possible cause may include interaction effects between the imaging beams and the media itself. For example, in various laser induced thermal transfer processes, imaging beams are scanned across the media assemblage to cause an image forming material to separate from a donor element and transfer to a receiver element. Various characteristics that are dependant on a particular direction of the scan may be developed within the transferred image forming material. For example, the shape of a transferred pixel of the image forming material may be dependant on the direction of the scan. The distribution of the transferred imaged forming material may also change in a direction of the scan path. Optical properties such as reflectivity or transmissivity may vary as a function of direction.

Exposure, E is defined in optics as the integral of the light intensity over time. Many imagable media respond to exposure. Exposure is related to an intensity of the imaging beam and exposure time of the imaging beam. Exposure can be related to the scanning speed of the imaging beam. Some imagable media follow the "law of reciprocity". For example, a media that follows the law of reciprocity can be exposed by radiation intensity I for a duration t, or with radiation intensity 10I for a duration 0.1t with similar results. In either case the exposure is the same (i.e. 10I×0.1t=I×t). Some media comprising photo-resists or electron beam resists are examples of media that behave substantially in accordance with the reciprocity law. There are other imagable media that do not obey the reciprocity law. Media that do not obey the reciprocity law include some thermal imaging materials. In some media, an image is formed when an exposure created by an imaging beam reaches, or exceeds an exposure threshold level associated with the media. In some media, the exposure threshold depends on the intensity. In some media, a minimum intensity threshold must be equaled or exceeded in order to form an image. In some cases, a media may behave substantially in accordance with the reciprocity law over a limited intensity range.

Figure 4A:
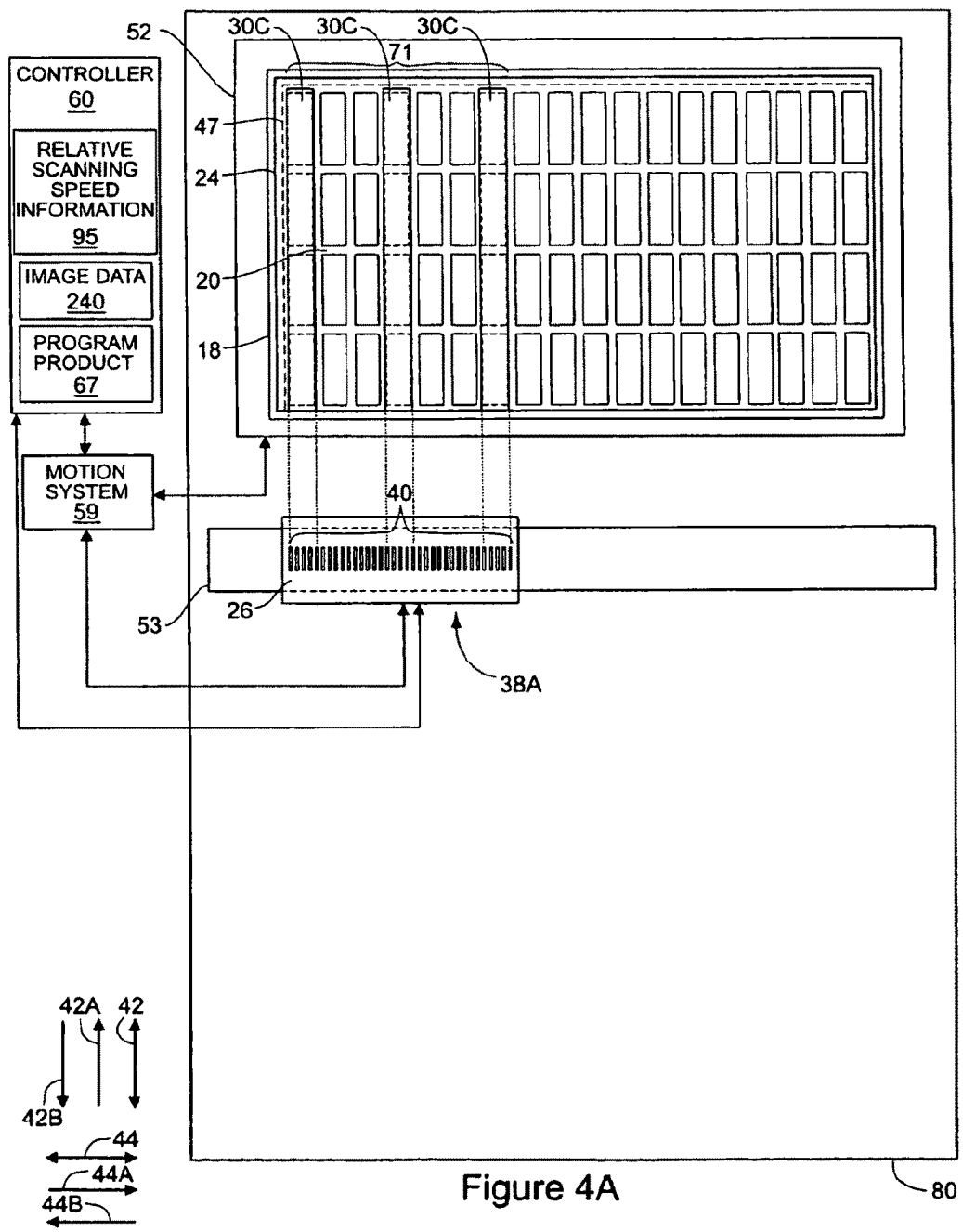
FIG. 4A is a is a schematic view of an apparatus forming a first portion of an image during a first scan as per an example embodiment of the invention.
Figure 4B:
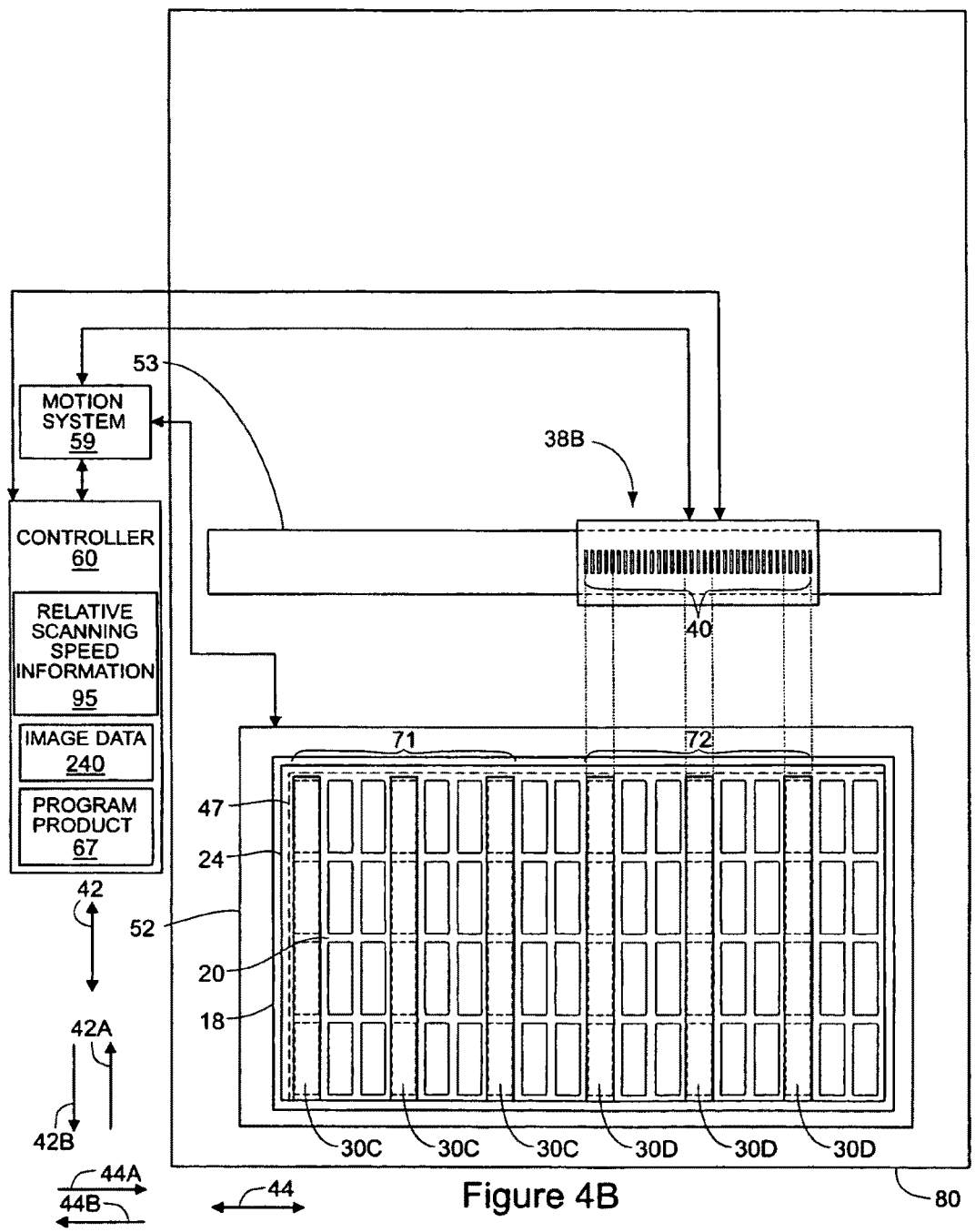
FIG. 4B is a is a schematic view of the apparatus of FIG. 4A forming a second portion of an image during a second scan as per an example embodiment of the invention.

FIGS. 4A and 4B schematically show an apparatus 80 used in an example embodiment of the invention. Apparatus 80 is operable for forming images on receiver element 18. In this example embodiment of the invention, images are formed on receiver element 18 by operating imaging head 26 to direct imaging beams while scanning over receiver element 18. The operation of apparatus 80 during a first scan is shown in FIG. 4A and the operation of apparatus 80 during a second scan is shown in FIG. 4B.

Apparatus 80 includes carrier 52 which is operable for conveying receiver element 18 along a first path aligned with main-scan axis 42. Carrier 52 can move in a reciprocating fashion. In this example embodiment of the invention, carrier is movable in a forward direction 42A and a reverse direction 42B. Imaging head 26 is arranged on a support 53 that straddles carrier 52. Imaging head 26 is controlled to move along a second path aligned with sub-scan axis 44. In this example embodiment of the invention imaging head 26 can be controlled to move along support 53. Imaging head 26 is movable in away direction 44A and in home direction 44B. Apparatus 80 forms images by bidirectionally scanning receiver element 18.

In this example embodiment of the invention, a laser induced thermal transfer process is employed. Imaging head 26 is controlled to scan the media with a plurality of imaging beams to cause a transferal of an image forming material (not shown) from donor element 24 to receiver element 18. Imaging electronics control activation timing of the imaging channels 40 to regulate the emission of the imaging beams. Motion system 59 (which can include one or more motion systems)

includes any suitable prime movers, transmission members, and/or guide members to cause the motion of carrier 52. In this example embodiment of the invention, motion system 59 controls the motion of imaging head 26 and controls the motion of carrier 52. Those skilled in the related art will realize that separate motion systems can also be used to operate different systems within apparatus 80.

Controller 60, which can include one or more controllers, is used to control one or more systems of apparatus 50 including, but not limited to, various motion systems 59 used by carrier 52 and imaging head 26. Controller 60 can also control media handling mechanisms that can initiate the loading and/or unloading of receiver element 18 and donor element 24. Controller 60 can also provide image data 240 to imaging head 26 and control imaging head 26 to emit imaging beams in accordance with this data. Various systems can be controlled using various control signals and/or implementing various methods. Controller 60 can be configured to execute suitable software and can include one or more data processors, together with suitable hardware, including by way of non-limiting example: accessible memory, logic circuitry, drivers, amplifiers, A/D and D/A converters, input/output ports and the like. Controller 60 can comprise, without limitation, a microprocessor, a computer-on-a-chip, the CPU of a computer or any other suitable microcontroller.

Figure 5:
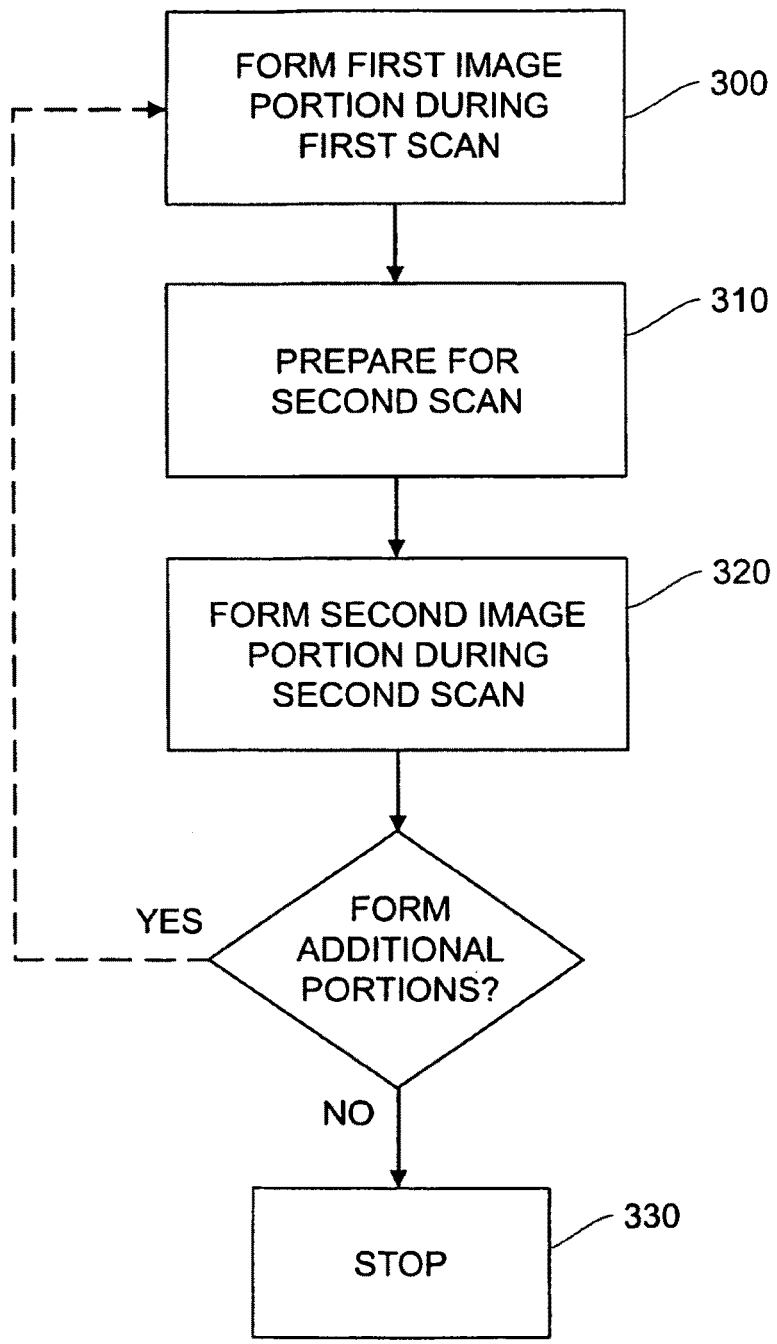
FIG. 5 is flow chart representing a method practiced as per an example embodiment of the invention.

FIG. 5 shows a flow chart for imaging a pattern of features such as stripe features 30C and 30D shown in FIGS. 4A and 4B as per an example embodiment of the invention. Stripe features 30C and 30D are similar to stripe features 30A and 30B shown in FIG. 2 and are also collectively referred to as stripe features 30. The pattern of features is formed by a plurality of scans. The FIG. 5 flow chart refers to apparatus 80 as schematically shown in FIGS. 4A and 4B, although it is understood that other apparatus are suitable for use with the illustrated process. The process begins a step 300 where imaging head 26 forms a first portion 71 of the image on receiver element 18. In this example embodiment of the invention, the first image portion 71 includes stripe features 30C. Controller 60 controls imaging head 26 to direct imaging beams along a first scan path to form first image portion 71 on receiver element 18. Controller 60 controls motion system 59 during the formation of various image portions.

As schematically shown in FIG. 4A, first image portion 71 is formed during a first scan in which imaging head 26 is operated to scan groups of imaging beams (not shown) in a first scan direction. In this example embodiment, each stripe feature 30C is imaged by a plurality of imaging beams during a first scan. During the first scan, controller 60 controls imaging head 26 to scan the imaging beams across receiver element 18 in the first scan direction at a first scanning speed. During the first scan, controller 60 controls motion system 59 to move carrier 52 along a first path. In this example, carrier 52 is moved in reverse direction 42B at a first speed. The first speed is related to the first scanning speed. In this example embodiment of the invention, carrier 52 can accelerate from a starting speed (which can include a zero velocity) to the first speed. In this example embodiment of the invention, the first speed is held constant as imaging head 26 directs imaging beams to form first image portion 71. The first scanning speed is selected to provide the imaging beams with an exposure that is suitable for forming first image portion 71.

On completion of the first scan, apparatus 80 is prepared to image a second image portion 72 during a second scan as shown in step 310. In this example embodiment of the invention, second image portion 72 includes stripe features 30D. Controller 60 can prepare apparatus 80 for the second scan in various ways. In this example embodiment of the invention, imaging head 26 was at a first sub-scan position (i.e. position 38A) while scanning along the scan path related to the first scan. In this example embodiment of the invention, controller 60 causes motion system 59 to move imaging head 26 along sub-scan axis 44 to a second position 38B after the first scan (i.e. see FIG. 4B). Imaging head 26 can be moved from the first position 38A to the second position 38B in various ways. For example, imaging head 26 can move between the two positions as carrier 52 decelerates from its first speed and/or as carrier 52 accelerates to another speed used in a subsequent scan. Carrier 52 can move through a point of zero velocity as imaging head 26 moves between the two positions. Carrier 52 can pause as imaging head moves between the two positions. In some example embodiments of the invention, imaging head 26 moves a distance from first position 38A to second position 38B that is less than an image swath width. In some example embodiments of the invention, second position 38B is the same as first position 38A.

In step 320 imaging head 26 forms second image portion 72 on receiver element 18. In this example embodiment of the invention, second image portion 72 includes stripe features 30D. As schematically shown in FIG. 4B, controller 60 controls imaging head 26 to direct imaging beams in a second scan direction to form second image portion 72 on receiver element 18. The second scan direction is different from the first scan direction. In this example, the second scan direction is opposite to the first scan direction. During the second scan, controller 60 controls imaging head 26 to scan the imaging beams across receiver element 18 in the second scan direction at a second scanning speed that is different form the first scanning speed. During the second scan, controller 60 controls motion system 59 to move carrier 52 along a second path. In this example, carrier 52 is moved in forward direction 42A at a second speed related to the second scanning speed. In this example embodiment of the invention, the second speed is different from the first speed. In this example embodiment of the invention, the second speed is held constant as imaging head 26 directs imaging beams to form second image portion 72. Image portions 72 and 71 are imaged by bidirectional scanning techniques.

The second scanning speed is selected to provide the imaging beams with an exposure that is suitable for forming second image portion 72. The second scanning speed is different from the fast scanning speed and is selected to enhance the imaging of second image portion 72. The second scanning speed forms part of set of imaging parameters selected to overcome differences in visual characteristics of second image portion 72 that would occur if that portion was imaged with the same image parameters employed in the imaging of first image portion 71. In some example embodiments of the invention, the second scanning speed is selected to produce a different exposure during the imaging of the second image portion 72 than the exposure produced during the imaging of the first image portion 71. The second scanning speed can be selected to form second image portion 72 with substantially the same visual characteristics as first image portion 71. The optimal scanning speed and carrier speed for the second scan can be determined by a trial and error test. For example, various test pattern images can be formed using scans at different speeds and examined to determine the best speed to minimize differences in visual characteristics.

An example of a measure that can be used to compare an visual characteristic of two imaged portions is the value $\Delta E$ that represents color differences in the CIE 1976 L*, a*, b* ("CIELAB") system as defined by the Commission Internationale de l'Eclairage (CIE). In some embodiments the differences in scanning speed is sufficient to achieve $\Delta E$ between the image portions (i.e. stripe features 30D and 30C) of 3 or less, 2 or less, and preferably 1 or less. In demanding applications ΔE may be 0.7 or less (e.g. about ½ or less).

Color density is another visual characteristic that can be compared between the imaged portions 71 and 72. Various reflectivity or transmissivity measures can be compared between the imaged portions 71 and 72.

After the formation of image second portion 72, the imaging portion can stop as shown in step 330. Alternatively, additional portions of the image can be formed as per various embodiments of the invention by repeating steps 300, 310 and 320. Alternatively, additional portions of the image can be produced by other techniques.

In some example embodiments of the invention, various portions of the image can be formed in an interleaved fashion. For example, a first image portion can include a plurality of image sub-portions that are separated from one another in one or more directions. Each of the image sub-portions are formed by scanning in a first direction during a first scan. A second image portion can be formed between the separated sub-portions by scanning in a second direction opposite to the first direction during a second scan. A first image portion can be overlapped by a second image portion. Features formed in a second image portion can be contiguous or non-contiguous with features formed in a first image portion.

Figure 6A:
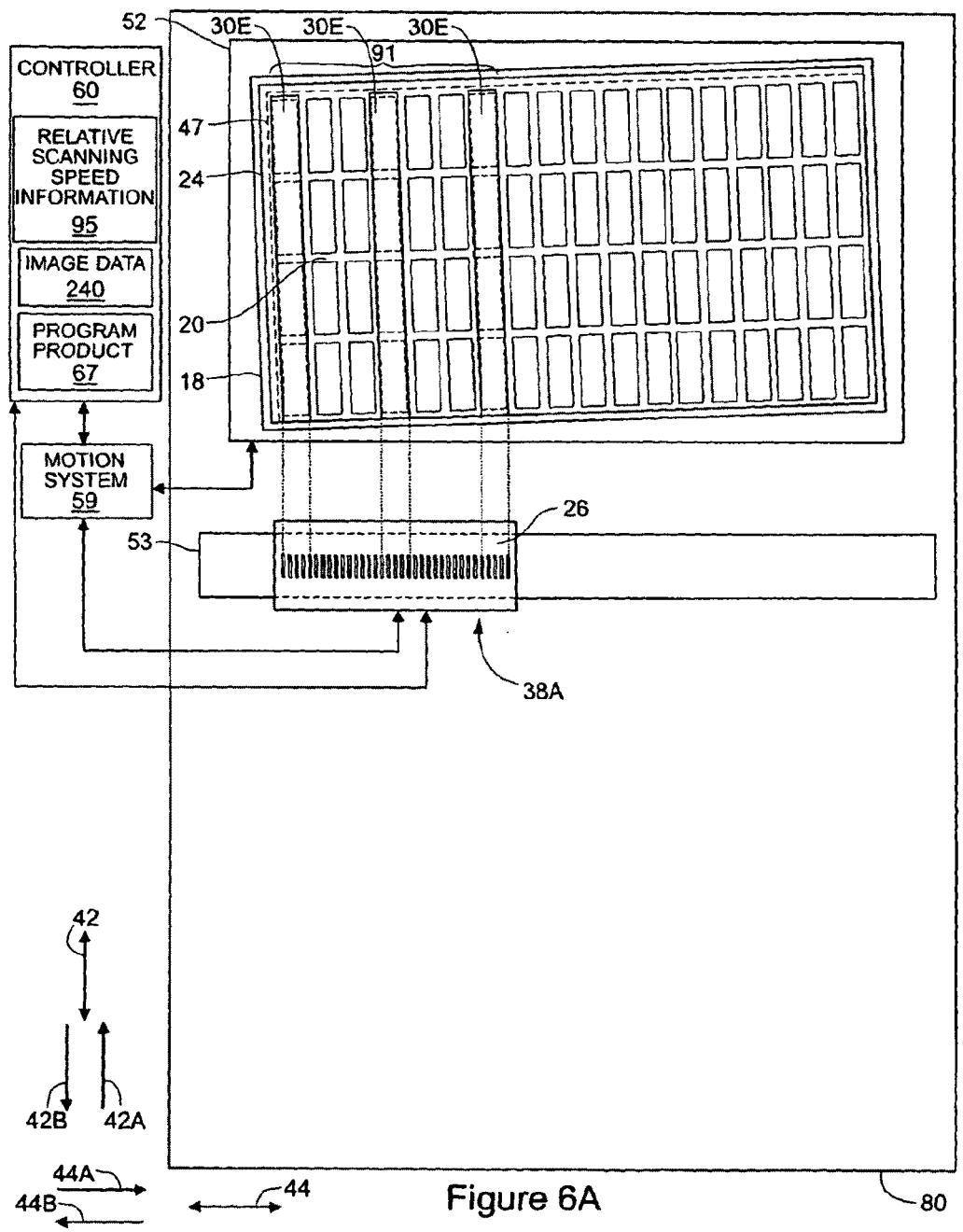
FIG. 6A is a schematic view of the apparatus of FIGS. 4A and 4B forming a first portion of another image during a first scan as per an example embodiment of the invention.
Figure 6B:
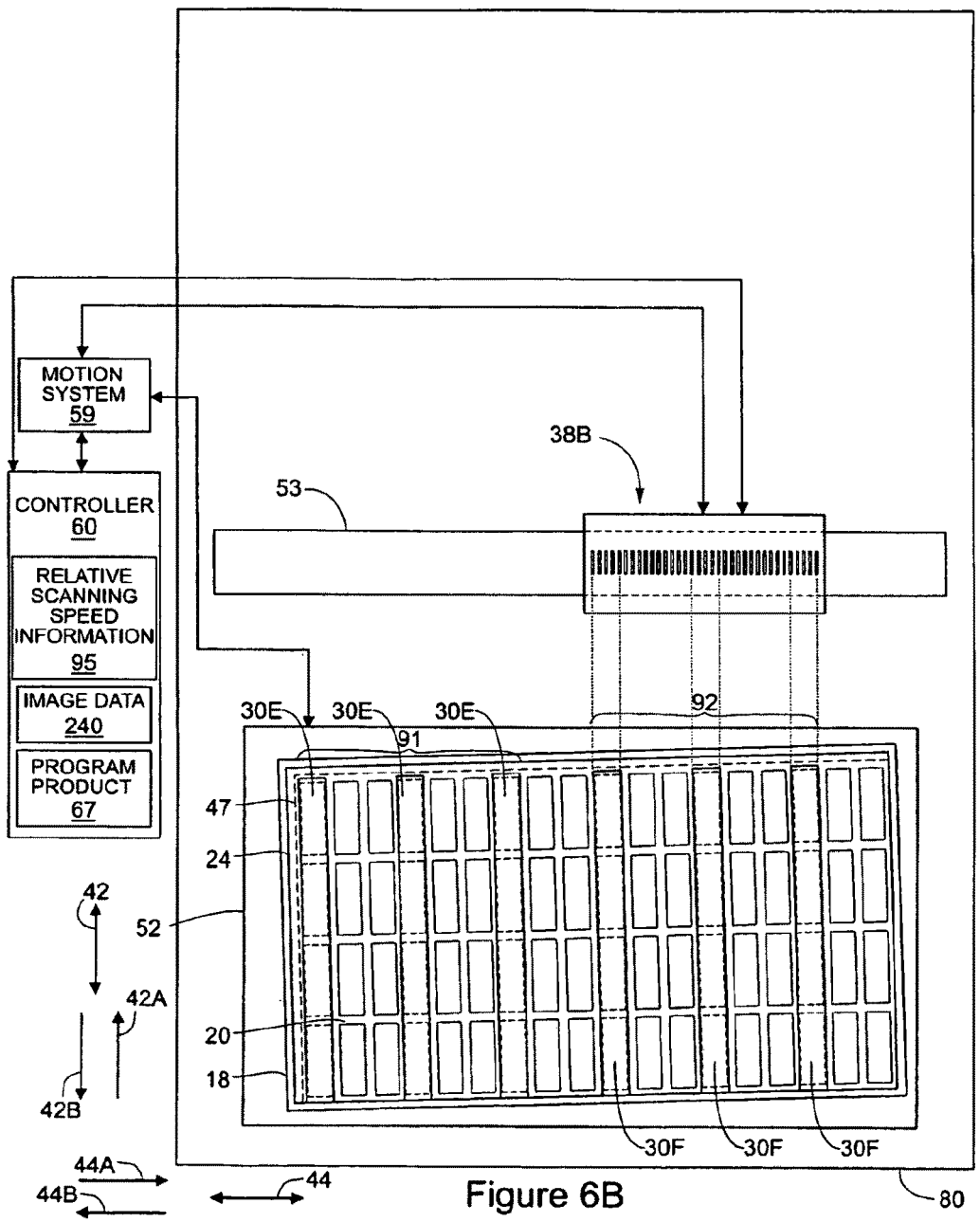
FIG. 6B is a schematic view of the apparatus of FIGS. 4A and 4B forming a second portion of another image during a second scan as per an example embodiment of the invention.

FIGS. 6A and 6B schematically shows apparatus 80 used to form another image during a plurality of scans as per an example embodiment of the invention (each of FIGS. 6A and 6B corresponding to a single scan). In this example embodiment, an image that includes a plurality of stripes features 30 (i.e. stripe features 30E and 30F) is formed. The image includes a plurality of image portions that includes a first image portion 91 made up of stripe features 30E and a second image portion 92 made up of stripe features 30F. Stripe features 30E and 30F are formed in a skewed relationship with sub-scan axis 44 (the amount of the skew in the figures is exaggerated for illustration purposes). Stripe features 30E and 30F are formed in a skewed relationship to a direction in which imaging channels 40 are arranged. The skewed orientation may be required for various reasons. For example, receiver element 18 (which includes matrix 20) may not be loaded in precise alignment with main-scan axis 42 and sub-scan axis 44 of apparatus 80. Even small rotations on the order of a few micro-radians can affect hamper efforts to accurately register the features with the matrix without detracting from the visual quality of the color filter.

In this example embodiment, stripe features 30E and 30F are formed in a required skewed orientation by establishing controlled relative motion between receiver element 18 and imaging head 26 as imaging beams are scanned along various scan paths. In this example embodiment, sub-scan motion is coordinated with main-scan motion in accordance with the amount of skew of the feature. As main-scan motion is provided between imaging head 26 and receiver element 18, synchronous sub-scan motion is also provided between imaging head 26 and receiver element 18 to create a motion referred to as coordinated motion. Unlike drum based imaging method where image swaths are imaged in a helical fashion wherein the amount of sub-scan motion during each drum rotation is defined independently of the image to be formed, the amount of sub-scan motion required during each scan is dependant on the image to be formed when coordinated motions are employed. Coordinated motion can be used to align scan paths with orientations of the imaged features. For example, during a scan, imaging head 26 is moved along a first path aligned with sub-scan axis 44 while receiver element 18 is synchronously moved along a second path aligned main-scan axis 42. The movement along the first and second paths is controlled to align the scan path of the image beams with a required orientation of a feature to be imaged. Coordinated motion techniques can be used to form a feature with at least one edge that is aligned with the coordinated motion path. The at least one edge can be parallel to the coordinated motion path. Coordinated motion can be used to form features with edges that are substantially smooth and continuous which in some demanding applications can be used to improve a visual characteristic of the feature, or to facilitate an alignment of the feature with a pattern of registration sub-regions (e.g. a color filter matrix). Coordinated motion techniques are beneficial when various features have different orientations or amounts of skew. For example, in color filter applications, productivity constraints typically require that multiple color filters be formed on a single universal receiver element (the universal receiver element being separated into the individual filters in a later step). The universal receiver element accordingly includes a corresponding number of color filter matrixes which are typically formed on the receiver element with step and repeat lithographic techniques. These lithographic techniques cause variability in the orientation of some of the matrixes with respect to other matrixes. Since the color filter features must be formed in registration with each of the matrixes, coordinated motion techniques can be used to accommodate this variability.

As shown in FIG. 6A, imaging head 26 directs various imaging beams in a first scan direction to form stripe features 30E during a first scan. As shown in FIG. 6B, imaging head 26 also directs various imaging beams in a second scan direction to form stripe features 30F during a second scan. The second scan direction is opposite to the first scan direction. During each scan, controller 60 controls motion system 59 to establish respective first and second coordinated motion paths. Each of the coordinated motion paths is established by controlling motion system 59 such that its sub-scan servo target position is directly tied in real time to main-scan motion. As main-scan motion is established, the required synchronous sub-scan motion is defined to correctly orient the imaged features. In this example embodiment, coordinated motion techniques are used to form stripe features 30E which are aligned with the first coordinated motion path and features 30F which are aligned with the second coordinated motion path. In this example embodiment, the orientation of stripe features 30E and 30F are parallel to their respective coordinated motion path. In this example embodiment, various edges of stripe features 30E and 30F are parallel to their respective coordinated motion path.

The second coordinated motion path is different from the first coordinated motion path. In this example embodiment of the invention, although the two coordinated motion paths are parallel to one another, the direction of the first coordinated motion path is opposite to the direction of the second coordinated motion path. In this example embodiment, carrier 52 moves relatively to receiver element 18 through a point of zero velocity as it transitions between the first and second coordinated motion paths. Imaging head 26 moves from a first position 38A to a second position 38B between the scans. Imaging head 26 can change its speed as it moves from first position 38A to second position 38B. Imaging head 26 can accelerate or decelerate as it moves from first position 38A to second position 38B.

In this example embodiment of the invention, imaging head 26 moves relatively to receiver element 18 along the first coordinated motion path at a first speed that is different from the second speed at which imaging head 26 moves relatively to receiver element 18 along the second coordinated motion path. The second speed is selected to provide the imaging beams with an exposure that is suitable for forming stripe feature 30F. The second speed is different from the first speed and is selected to enhance the imaging of stripe features 30F. The second speed forms part of a set of imaging parameters selected to overcome differences in visual characteristics of stripe features 30F that would occur if they were imaged with the same image parameters employed in the imaging of stripe features 30E. In some example embodiments of the invention, the second speed is selected to produce a different exposure during the imaging of the stripe features 30F than the exposure produced during the imaging of the stripe features 30E. The second speed is selected to form stripe features 30F with substantially the same visual characteristics as stripe features 30E.

In this example embodiment of the invention, the second speed is adjusted in a manner that allows the second coordinated motion path to maintain a desired orientation while maintaining a desired visual characteristic among the imaged features. The orientation of stripe features 30F can be adversely affected if the second speed is adjusted arbitrarily to achieve a desired visual characteristic in stripe features 30E. Since the orientation of each imaged feature is dependant on establishing a motion path that is governed by relationship in which a sub-scan motion is coordinated with a main-scan motion, a speed adjustment along that path to establish a desired visual characteristic needs to be made in accordance with that relationship. In this example embodiment, the stripe features 30E and 30F are parallel to one another. Although the second speed is different form the first speed in order to establish similar visual characteristics between the features, the ratio of main-scan movement to sub-scan movement is the same in both the first and second coordinated motion paths to preserve a desired orientation between the features. In this case, although rate of movement in associated main-scan and sub-scan directions is different for each of the first and second coordinated motion paths, the differences are made in a manner in the ratio of main-scan speed to sub-scan speed remains the same for each path.

Imaging head 26 may comprise any suitable multi-channel imaging head having individually-addressable channels, each channel capable of producing an imaging beam operable form forming an image pixel. Imaging head 26 can include various arrangements of imaging channels 40 including one-dimensional or two-dimensional arrays of imaging channels 40. Any suitable mechanism may be used to generate imaging beams. The imaging beams may be arranged in any suitable way.

Some embodiments of the invention employ infrared lasers. Infrared diode laser arrays employing 150 µm emitters with total power output of around 50 W at a wavelength of 830 nm can be used. Alternative lasers including visible light lasers may also be used in practicing the invention. The choice of laser source employed may be motivated by the properties of the media to be imaged.

Various example embodiments of the invention have been described in terms of a laser induced thermal transfer processes in which an image forming material is transferred to a receiver element. Other example embodiments of the invention can be employed with other imaging processes and media. Images can be formed on media by different processes without departing from the scope of the present invention. For example, media can include an image modifiable surface, wherein a property or characteristic of the modifiable surface is changed when irradiated by an imaging beam to form an image. An imaging beam can be used to ablate a surface of media to form an image. Those skilled in the art will realize that different imaging methods can be readily employed.

A program product 67 can be used by controller 60 to perform various functions required by apparatus 80. One such function can include setting control parameters for imaging head 26 and motion system 59 to establish image portions with substantially similar visual characteristics as described herein. Without limitation, program product 67 may comprise any medium which carries a set of computer-readable signals comprising instructions which, when executed by a computer processor, cause the computer processor to execute a method as described herein. The program product 67 may be in any of a wide variety of forms. Program product 67 can comprise, for example, physical media such as magnetic storage media including, floppy diskettes, hard disk drives, optical data storage media including CD ROMs, DVDs, electronic data storage media including ROMs, flash RAM, or the like. The instructions can optionally be compressed and/or encrypted on the medium.

In one example embodiment of the invention, program product 67 can be used to cause imaging head 26 to direct imaging beams to form a portion of an image on receiver element 18 while scanning over receiver element 18 in a first direction with a first scanning speed, and cause imaging head 26 to direct imaging beams to form a second portion of the image on receiver element 18 while scanning in an opposite direction at a second scanning speed that is different form the first scanning speed. The first and second scanning speeds can be assigned automatically by controller 60. In the alternative, or additionally, controller 60 may permit manual assignment or adjustment of the scanning speeds under the guidance of an operator communicating with controller 60 through an appropriate user interface. Determination of scanning speed differences can be made on the basis of suitable algorithms and/or data inputted to controller 60, or programmed within program product 67. The control parameters can be determined in advance of imaging or may be determined "on the fly" as imaging progresses.

In some example embodiment of the invention, program product 67 can be used to cause controller 60 to vary the rate of relevant movement between imaging head 26 and receiver element 18 during each scan. Controller 60 can be operated to control motion system 59 to move imaging head 26 relative to receiver element 18 in a first direction at a first speed and in second direction different from the first direction at second speed different from the first speed. Controller 60 can be operated to control motion system 59 such that the first direction and the second direction are parallel to one another while maintaining different first and second speeds. Controller 60 can be operated to cause imaging head 26 to bidirectionally image a plurality of features such that the features formed along opposing scan paths have substantially the same visual characteristics while being properly aligned to one another. Controller 60 can be operated to adjust various coordinated motion parameters in accordance with a desired change in scanning speed associated with the coordinated motion.

In some example embodiments, controller 60 maintains relative scanning speed information 95 for the imaging beams emitted by imaging head 26 that specifies different scanning speeds to set for the imaging beams as a function of scan direction. If it is determined that imaging head 26 is required to emit a radiation beam while scanning in a determined scan direction, controller 60 can automatically adjust the scanning speed to a value specified by relative scanning speed information 95. Relative scanning speed information 95 can specify direction-specific scanning speeds, each of which can cause a media to be exposed with a desired exposure during each scan. The exposures can be greater than an exposure threshold of the media.

The various image portions may be imaged in accordance with image data that includes halftone screening data. In halftone imaging, features comprise a pattern of elements known halftone dots. The halftone dots vary in size according to the desired lightness or darkness of the imaged feature. Each halftone dot is typically larger than pixels imaged by imaging head 26 and is typically made up of a matrix of pixels imaged by a plurality of imaging channels. Halftone dots are typically imaged at a chosen screen ruling typically defined by the number of halftone dots per unit length and a chosen screen angle typically defined by an angle at which the halftone dots are oriented. In example embodiments of the invention, various features 30 may be imaged with a screen density in accordance with the corresponding halftone screen data chosen to image that feature.

In other example embodiments of the invention, various image portions may be imaged with stochastic screen made up of a varying spatial frequency of equally sized dots. In yet other example embodiments of the invention, an image may be imaged with a combined halftone and stochastic screen (commonly referred to as a "hybrid" screen).

Patterns of features have been described in terms of patterns of color features in a display. In some example embodiments of the invention, the features can be part of an LCD display. In other example embodiments of the inventions, the features can be part of an organic light-emitting diode (OLED) display. OLED displays can include different configurations. For example, in a fashion similar to LCD display, different color features can be formed into a color filter used in conjunction with a white OLED source. Alternatively, different color illumination sources in the display can be formed with different OLED materials with various embodiments of the invention. In these embodiments, the OLED based illumination sources themselves control the emission of colored light without necessarily requiring a passive color filter. OLED materials can be transferred to suitable media. OLED materials can be transferred to a receiver element with laser-induced thermal transfer techniques.

Various example embodiments of the invention have been described in terms of imaging stripe features. The stripes can have edges extending parallel to a scan direction. The stripes can be continuous or interrupted. The invention however is not limited to imaging stripes but can be used to image features that include other shapes. The invention can be used to image island features also.

While the invention has been described using as examples applications in display and electronic device fabrication, the methods described herein are directly applicable to other applications including those used in biomedical imaging for lab-on-a-chip (LOC) fabrication. LOC devices may include several repeating patterns of features. The invention can have application to other technologies, such as medical, printing and electronic fabrication technologies.

It is to be understood that the exemplary embodiments are merely illustrative of the present invention and that many variations of the above-described embodiments can be devised by one skilled in the art without departing from the scope of the invention.

What is claimed is:

1. A method for forming an image by thermal transfer with media comprising a donor element and a receiver element, the method comprising:
   operating an imaging head comprising one or more imaging channels to emit imaging beams;
   forming a first portion of the image while scanning a first group of the imaging beams in a first direction over the media at a first scanning speed to transfer material from the donor element to the receiver element; and
   forming a second portion of the image while scanning a second group of the imaging beams in a second direction over the media at a second scanning speed to transfer additional material from the donor element to the receiver element, wherein the second scanning speed is different from the first scanning speed and the second direction is opposite to the first direction.

2. A method according to claim 1, comprising forming the first portion of the image with a first exposure and forming the second portion of the image with a second exposure, wherein the second exposure is different from the first exposure.

3. A method according to claim 1, comprising establishing relative motion between the imaging head and the media while forming at least one of the first portion of the image and the second portion of the image.

4. A method according to claim 1, comprising moving at least one of the media and the imaging head in one of the first direction and the second direction while forming each of the first portion of the image and the second portion of the image.

5. A method according to claim 1, comprising moving one of the media and the imaging head along a first path while forming the first portion of the image and moving one of the media and the imaging head along a second path while forming the second portion of the image, wherein the second path is substantially parallel to the first path.

6. A method according to claim 5, wherein the first and second paths are in directions which oppose one another.

7. A method according to claim 5, wherein moving the one of the media and the imaging head along the first path comprises moving the media in a forward direction and moving the one of the media and the imaging head along the second path comprises moving the media in a reverse direction.

8. A method according to claim 1, comprising moving at least one of the media and the imaging head while forming each of the first portion of the image and the second portion of the image, wherein a rate of movement of the at least one of the media and the imaging head during the formation of the first portion of the image is different than a rate of movement of the at least one of the media and the imaging head during the formation of the second portion of the image.

9. A method according to claim 1, comprising moving the imaging head in one or more sub-scan directions while forming the first portion of the image and the second portion of the image, wherein a sub-scan speed of the imaging head is different during the formation of the first portion of the image than during the formation of the second portion of the image.

10. A method according to claim 1, comprising moving the media in one or more main-scan directions while forming the first portion of the image and the second portion of the image, wherein a main-scan speed of the media is different during the formation of the first portion of the image than during the formation of the second portion of the image.

11. A method according to claim 1, comprising:
   moving the media in one or more first path directions while forming the first portion of the image and the second portion of the image; and
   moving the imaging head in one or more second path directions while forming the first portion of the image and the second portion of the image, wherein each of the first and second directions is skewed to each of the one or more first path directions and to each of the one or more second path directions.

12. A method according to claim 11, wherein each direction of the one or more first path directions intersects each direction of the one or more second path directions.

13. A method according to claim 1, wherein the first portion of the image comprises a plurality of sub-portions separated from one another, the method comprising forming the second portion of the image between the separated sub-portions.

14. A method according to claim 1, comprising overlapping the second portion of the image over the first portion of the image.

15. A method according to claim 1, comprising repeatedly scanning in the first direction and repeatedly scanning in the second direction, wherein each scan in the first direction alternates with each scan in the second direction.

16. A method according to claim 1, comprising moving the imaging head relatively to the media along a first path while forming the first portion of the image, and moving the imaging head relatively to the media along a second path while forming the second portion of the image, wherein the second path is substantially parallel to the first path.

17. A method according to claim 1, wherein the material comprises an OLED material.

18. A method according to claim 1, wherein the one or more imaging channels comprise a plurality of sets of the imaging channels, the method comprising operating a set of the imaging channels to emit the first group of the one or more imaging beams and operating a different set of the imaging channels to emit the second group of the one or more imaging beams.

19. A method for forming an image on media, comprising:
operating an imaging head comprising an arrangement of individually addressable imaging channels to scan imaging beams across the media to form the image during a plurality of scans;
moving the imaging head relative to the media along a first path at a first speed while scanning the imaging beams over the media during a first scan;
moving the imaging head relative to the media along a second path at a second speed while scanning the imaging beams over the media during a second scan, wherein the second speed is not equal to the first speed; and
moving the imaging head relative to the media through a point of zero velocity between the first and second scans.

20. A method according to claim 19, wherein the first path is parallel to the second path.

21. A method according to claim 19, wherein the first and second paths are in directions which oppose one another.

22. A method according to claim 19, wherein the first path comprises a first coordinated motion path.

23. A method according to claim 22, wherein the second path comprises a second coordinated motion path.

24. A method according to claim 19, comprising moving both the imaging head and the media during at least one of the first scan and the second scan.

25. A method according to claim 24, wherein moving both the imaging head and the media comprises synchronously moving the imaging head and the media.

26. A method according to claim 19, wherein moving the imaging head relative to the media along the second path comprises establishing relative movement between the imaging head and the media in a first direction and in a second direction that intersects the first direction, the method comprising adjusting a rate of movement in both the first and second directions to make the second path parallel to the first path.

27. A method according to claim 19, comprising forming a first portion of the image with a first exposure and forming a second portion of the image with a second exposure, wherein the second exposure is different from the first exposure.

28. A method according to claim 27, wherein the first portion of the image is formed during the first scan and the second portion of the image is formed during the second scan.

29. A method according to claim 19, wherein moving the imaging head relative to the media along the first path comprises moving one of the imaging head and the media in a first direction and moving the other of the imaging head and the media in a second direction substantially perpendicular to the first direction; and moving the imaging head relative to the media along the second path comprises moving the one of the imaging head and the media in a third direction and moving the other of the imaging head and the media in a forth direction substantially perpendicular to the third direction, wherein the ratio of the rate of movement in the third direction to the rate of movement in the fourth direction is adjusted to equal the ratio of the of the rate of movement in the first direction to the rate of movement in the second direction.

30. A method for forming an image on media, comprising:
operating an imaging head to scan one or more imaging beams across the media to form a first portion of the image with a first exposure during a first scan and to form a second portion of the image with a second exposure during a second scan;
moving the imaging head relative to the media along a first path at a first speed during the first scan;
moving the imaging head relative to the media along a second path at a second speed during the second scan, wherein the second speed is different from the first speed and the second exposure is different from the first exposure.

31. A method according to claim 30, wherein each of the first exposure and the second exposure is equal to, or greater than an exposure threshold of the media.

32. A method according to claim 30, wherein the first and second paths are in directions which oppose one another.

33. An imaging method, comprising:
operating an imaging head to scan imaging beams over media to form an image;
maintaining relative scanning speed information associated with at least one imaging beam; the relative scanning speed information specifying a first relative scanning speed to set for the at least one imaging beam in the event that the at least one imaging beam is to be scanned over the media in a first direction, and specifying a second relative scanning speed that is different from the first relative scanning speed to set for the at least one imaging beam in the event that the at least one imaging beam is to be scanned over the media in a second direction that is opposite to the first direction;
determining the direction of a scan; and
controlling the imaging head according to the relative scanning speed information to scan the at least one imaging beam at the relative scanning speed corresponding to the determined direction.

34. A method according to claim 33, wherein each of the first relative scanning speed and the second relative scanning speed is sufficient to create an exposure greater than or equal to an exposure threshold of the media.

35. A method according to claim 33, wherein scanning the imaging beams over the media to form the image comprises moving at least one of the imaging head and the media.

* * * * *